(12) United States Patent  (10) Patent No.: US 8,494,902 B2
Krantz et al.  (45) Date of Patent: Jul. 23, 2013

(54) SYSTEM AND METHOD OF SELECTING ADVERTISING CONTENT

(75) Inventors: David Krantz, San Antonio, TX (US);
Lee Culver, San Antonio, TX (US);
Justin Marcucci, Chester, NJ (US);
Susan Novell, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1098 days.

(21) Appl. No.: 11/848,970

(22) Filed: Aug. 31, 2007

(65) Prior Publication Data

US 2009/0063263 A1 Mar. 5, 2009

(51) Int. Cl.
*G06Q 30/00* (2006.01)

(52) U.S. Cl.
USPC ............. 705/14.4; 705/14.25; 705/14.67; 705/14.73

(58) Field of Classification Search
USPC ............. 705/14.4, 14.25, 14.67, 14.73
See application file for complete search history.

(56) References Cited

U.S. PATENT DOCUMENTS

| | | | |
|---|---|---|---|
| 5,948,061 A | 9/1999 | Merriman et al. | |
| 6,285,987 B1 | 9/2001 | Roth et al. | |
| 6,317,761 B1 | 11/2001 | Landsman et al. | |
| 6,636,246 B1 | 10/2003 | Gallo et al. | |
| 7,013,435 B2 | 3/2006 | Gallo et al. | |
| 7,069,235 B1 | 6/2006 | Postelnik et al. | |
| 2001/0028369 A1 | 10/2001 | Gallo et al. | |
| 2002/0163546 A1 | 11/2002 | Gallo | |
| 2006/0156228 A1* | 7/2006 | Gallo et al. | 715/523 |
| 2008/0010270 A1* | 1/2008 | Gross | 707/5 |

OTHER PUBLICATIONS

Amy Grenek Edelman, 2D Search Officially Obsolete: SpaceTime Reinvents Searching the Web—New Application Turns Google, Yahoo!, eBay into 3D Experience, www.spacetime.com, Jun. 4, 2007 (2 pgs).
SpaceTime—Search Google, YouTube, RSS, eBay, Amazon, Yahoo!, Flickr and Images all in one 3D space, www.spacetime.com, (2 pgs).
Patricia Fusco, AT&T's Ad-Supported Internet Access Plan, www.isp-planet.com, Jul. 21, 2000, Jupitermedia Corporation, (4 pgs).
Bob Woods, Newbytes News Network—Juno Offering Free Ad-Supported Web Access, www.findarticles.com, Dec. 20, 1999, (2 pgs).

* cited by examiner

*Primary Examiner* — Naresh Vig
(74) *Attorney, Agent, or Firm* — Toler Law Group, PC

(57) ABSTRACT

Systems and methods of selecting advertising content are provided. A method of selecting advertising content includes analyzing first data associated with a first display element of the plurality of independent display elements. The plurality of independent display elements are associated with a representation of a three-dimensional object. The method also includes analyzing second data associated with a second display element of the plurality of independent display elements. The method further includes selecting, based at least partially on the first data and the second data, first advertisement content for display via an advertisement window separate from the first display element and the second display element.

25 Claims, 4 Drawing Sheets

SYSTEM AND METHOD OF SELECTING ADVERTISING CONTENT

FIELD OF THE DISCLOSURE

The present disclosure is generally related to selecting advertising content.

BACKGROUND

Advertisers seek to get and keep the public's attention in order to generate sales. Advertisers may put considerable time and expense into finding effective modes of advertising. One aspect advertisers may consider is how best to provide information to their target market. Online advertising has opened up new opportunities to target advertising to individuals. Hence, there is a need for an improved system and method of selecting advertising content.

DETAILED DESCRIPTION OF THE DRAWINGS

A system to select advertising content is provided. The system includes a three-dimensional graphical display module to generate a three-dimensional graphical display at a display device. The three-dimensional graphical display includes a plurality of independent display elements. The system also includes an advertisement module to display an advertisement window separate from each of the plurality of independent display windows of the three-dimensional graphical display.

A method of selecting advertising content is provided. The method includes analyzing first data associated with a first display element of a plurality of independent display elements. The plurality of independent display elements are associated with a representation of a three-dimensional object. The method further includes analyzing second data associated with a second display element of the plurality of independent display elements. The method further includes selecting, based at least partially on the first data and the second data, first advertisement content for display via an advertisement window separate from the first display element and the second display element.

A processor-readable medium is also provided. The processor-readable medium includes instructions executable by a processor to implement a method including analyzing first data associated with a first display element of a plurality of independent display elements. The method also includes analyzing second data associated with a second display element of the plurality of independent display elements. The method further includes selecting, based at least partially on the first data and the second data, advertisement content for display via an advertisement window separate from the first display element and the second display element.

Figure 1:
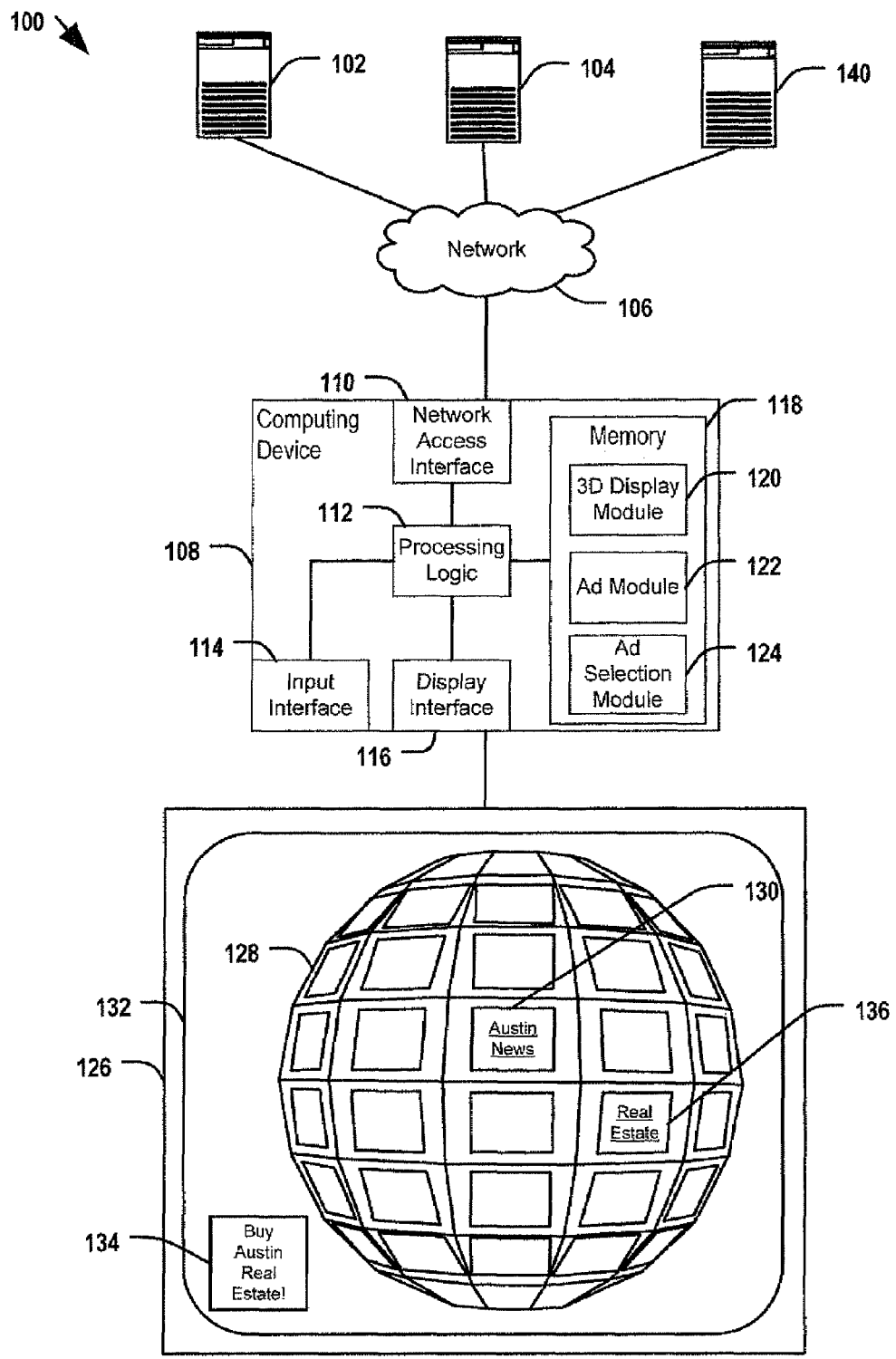
FIG. 1 is a diagram of an embodiment of a system to select advertising content.

FIG. 1 depicts a particular embodiment of a system to select advertising content, the system generally designated 100. The system 100 includes a computing device 108 coupled to a display device 126 and a network 106. The computing device 108 includes processing logic 112 and memory 118 accessible to the processing logic 112. The computing device 108 is adapted to communicate with one or more content servers, such as a first server 102, a second server 104, and a third server 140 via the network 106. The computing device 108 is also adapted to generate a user interface display 132 at the display device 126. In an illustrative embodiment, the computing device 108 may include a set-top box (STB) device. In a particular illustrative embodiment, the network 106 may include an access network of an Internet Protocol Television (IPTV) system.

In a particular embodiment the computing device 108 includes a three-dimensional graphical display module 120. The three-dimensional graphical display module 120 is adapted to generate a three-dimensional graphical display 132 at the display device 126. In a particular embodiment, the three-dimensional graphical display 132 includes a plurality of independent display elements, such as a first display element 130, and a second display element 136, associated with a graphical representation of a three-dimensional object 128. Each display element of the plurality of independent display elements may be associated with a software application providing content to the independent display element. For example, the first display element 130 may be associated with a browser application and the second display element 136 may be associated with a text editor application. In another example, the first display element 130 may be associated with a browser application receiving content from the first server 102 and the second display element 136 may be associated with the same browser application or a different browser application receiving content from the second server 104. Each of the plurality of independent display elements may be associated with a different software application, different content, a different content server, or any combination thereof.

In a particular embodiment, the three-dimensional graphical display module 120 may be adapted to change a view of the three-dimensional graphical display 132 or to change one or more display elements of the plurality of independent display elements. In an illustrative embodiment, the three-dimensional graphical display module 120 may be adapted to zoom closer to or further from one or more of the independent display elements. For example, in response to user input received via an input interface 114, the three-dimensional graphical display 132 may be modified to make the user's view of the display move closer to the first display element 130 or further from the first display element 130. In another illustrative embodiment, the three-dimensional graphical display module 120 may be adapted to hide one or more of the independent display elements. For example, the representation of the three-dimensional object 128 may be rotatable within the three-dimensional graphical display 132. Thus, by providing input via the input interface 114, the user may be able to rotate a view of the independent display elements such that one or more of the independent display elements is rotated behind the three-dimensional object 128 and is no longer visible. Additionally, the position of the independent display elements in the display may be changed based on the rotational input provided by the user. For example, as depicted in FIG. 1, the first display element 130 is positioned approximately centered on the view of the representation of the three-dimensional object 128. However, by rotating the representation of the three-dimensional object 128, the first display element 130 may move to a position away from the center of the representation of the three-dimensional object 128.

In a particular embodiment, the computing device 108 may also include an advertisement module 122. The advertisement module 122 may be executable by the processing logic 112 to display an advertisement window 134 at the display device 126. The advertisement window 134 may be separate from the first display element 130 and the second display element 136. In an illustrative embodiment, the advertisement window 134 may be separate from each of the plurality of independent display elements. In a particular illustrative embodiment, the advertisement window 134 may be separate from the representation of the three-dimensional object 128. In another illustrative embodiment, the advertisement window 134 maybe associated with one of the plurality of independent display elements.

In a particular embodiment the computing device 108 includes an advertisement selection module 124. The advertisement selection module 124 may be executable by the processing logic 112 to select advertising content to display via the advertisement window 134. The advertisement selection module 124 may select advertising content based on information associated with one or more of the plurality of independent display elements. For example, the advertisement selection module 124 may select the advertising content based on content displayed at one or more of the independent display elements, such as the first display element 130, the second display element 136, another display element, or any combination thereof. To illustrate, the first display element 130 includes first content (i.e., news information associated with Austin, Tex.), and the second display element 136 includes second content (i.e., real estate information). The advertisement selection module 124 may use pattern recognition techniques to identify advertising content that is relevant to the first content and the second content, e.g., Austin-area real estate information. In another example, the advertisement selection module 124 may select advertising content based on historical information associated with the first display element 130, based on historical information associated with the second display element 136, or any combination thereof. The historical information may include information about content previously displayed at a particular display element, such as a browser history file or a browser cookie; a recently accessed files list; other historical information; or any combination thereof. In another example, the advertisement selection module 124 may select advertising content for display at the display window 134 based on other information associated with the first display element 130, the second display element 136, or any combination thereof. For example, the information associated with the first display element 130 may include metadata associated with content displayed at the first display element 130; bookmarks or favorites associated with the first display element 130; a network address, such as a universal resource locator associated with content displayed at the first display element 130; or any combination thereof. The information associated with the second display element 136 may include metadata associated with content displayed at the second display element 136; bookmarks or favorites associated with the second display element 136; a network address, such as a universal resource locator associated with content displayed at the second display element 136; or any combination thereof.

In a particular embodiment, the advertisement selection module 124 may also select advertising content for display via the advertisement window 134 based on display information associated with one or more of the independent display elements. For example, the advertisement selection module 124 may place more weight on information associated with some of the display elements than on information associated with other display elements. In an illustrative embodiment, the advertisement selection module 124 may weight information associated with a particular display element based on display information such as a position of the one or more display elements, whether the particular display element is active or inactive, whether the particular display element is hidden or in view, a size of the particular display element, or any combination thereof. For example, the first display element 130 may be an active display element and the second display element 138 may be an inactive display element. In selecting advertising content for display, the advertisement selection module 124 may place more weight on information associated with active display elements than on information associated with inactive display elements. Therefore, more weight may be placed on information associated with the first display element 130. In another example, the first display element 130 is located closer to the center of the three-dimensional graphical display 132 than the second display element 136. In selecting advertising content for display, the advertisement selection module 124 may place more weight on information associated with display elements that are closer to the center of the three-dimensional graphical display 132. Therefore, more weight may be placed on information associated with the first display element 130. In another example, the first display element 130 is in view in the three-dimensional graphical display 132; however, one or more other independent display elements may be hidden behind the representation of the three-dimensional object 128. In selecting advertising content for display, the advertisement selection module 124 may place more weight on information associated with display elements that are in view than on hidden display elements. Therefore, more weight may be placed on information associated with the first display element 130. In another example, the display information may also be associated with a size of one or more display elements within the three-dimensional graphical display 132. In selecting advertising content for display, the advertisement selection module 124 may place more weight on information associated with larger display elements.

In a particular embodiment, the advertisement selection module 124 may select advertisement content for display via advertisement window 134 based on one or more user settings. For example, the user settings may include settings to block certain advertising content or advertising content associated with particular vendors.

The computing device 108 may also include a network access module 110. The network access module 110 may be adapted to receive content for display via one or more of the independent display elements from one or more content servers, such as the first server 102 and the second server 104. The network access module 110 may also be adapted to receive advertising content for display via the advertisement window 134 from one or more advertisement content servers, such as a third server 140. In an illustrative embodiment, the advertisement selection module 124 selects advertising content for display via the advertisement window 134 and sends a request to the third server 140 to receive the advertising content via the network access module 110. The advertisement module 122 receives the advertising content and processes the advertising content for display at the display device 126 via the display interface 116.

Figure 2:
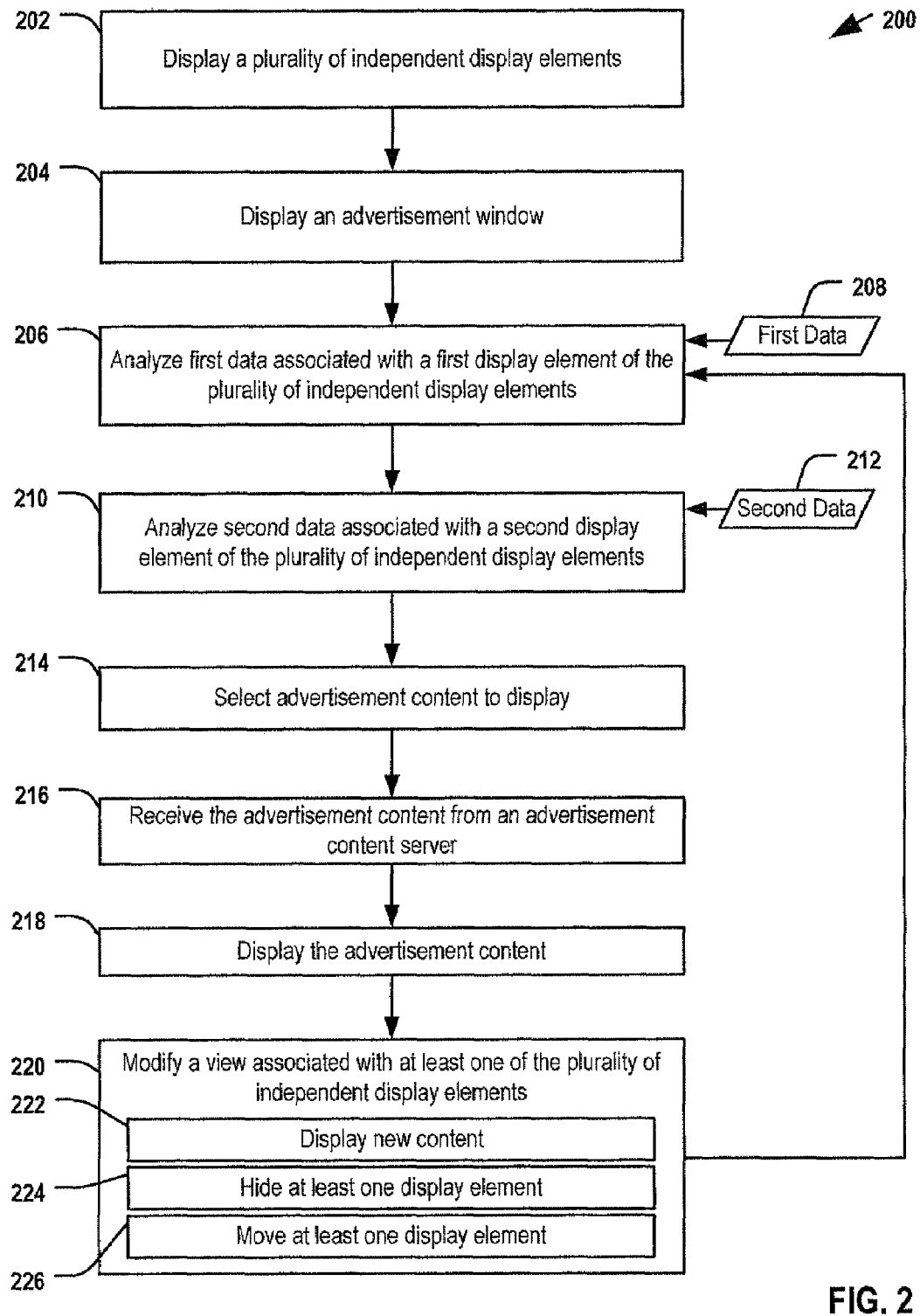
FIG. 2 is a flow diagram of an embodiment of a method of selecting advertising content.

FIG. 2 depicts a particular embodiment of a method to select advertising content, the method generally designated 200. The method 200 includes, at 202, displaying a plurality of independent display elements. In an illustrative embodiment, the plurality of independent display elements may be associated with a representation of a three-dimensional object. For example, the representation of the three-dimensional object may include a sphere; a cube; one or more physical buildings, such as a plurality of stores; another physical object or geometric shape; or any combination thereof. The plurality of independent display elements may be associated with one or more software applications. For example, one or more of the plurality of independent display elements may be associated with a browser application. Additionally, one or more of the plurality of independent display elements may be associated with a text editor application. The plurality of independent display elements may include one or more active display elements and one or more inactive display elements. An active display element may include an element activated for user interaction and an inactive display element may include a display element that is not activated for user interaction. The plurality of independent display elements may also include one or more hidden display elements and one or more visible display elements.

The method 200 may also include, at 204, displaying an advertisement window. The advertisement window may be separate from the plurality of independent display elements. For example, the advertisement window may be displayed in a separate window associated with the representation of the three-dimensional object or separate from the representation of the three-dimensional object.

The method 200 may also include, at 206, analyzing first data 208 associated with a first display element of the plurality of independent display elements. The first data 208 may include content associated with the first display element, including text, graphics or multimedia content; metadata associated with content displayed at the first display element; other data available from a server providing the content displayed at the first display element; or any combination thereof. The first data 208 may also include historical information associated with the first display element, such as a browser history file or one or more cookie files. The first data 208 may also include bookmarks or favorites associated with the first display element.

The method 200 may also include, at 210, analyzing second data 212 associated with a second display element of the plurality of independent display elements. The second data 212 may include content associated with the second display element, including text, graphics or multimedia content; metadata associated with content displayed at the second display element; other data available from a server providing the content displayed at the second display element; or any combination thereof. The second data 212 may also include historical information associated with the second display element, such as a browser history file or one or more cookie files. The second data 212 may also include bookmarks or favorites associated with the second display element. In a particular embodiment, additional data associated with additional display elements may also be analyzed. For example, data associated with any number of the independent display elements may be analyzed to select advertising content.

The method 200 may also include, at 214, selecting advertisement content for display via the advertisement window. The advertisement content may be selected based on the first data 208 and the second data 212. For example, the advertisement content may be selected using pattern recognition techniques to identify advertising topics that are related to portions of the first data 208 and portions of the second data 212. Advertisement content that is most closely related to the first data 208 and second data 212 may be selected. In a particular embodiment, the nearness of advertisement content to the first data 208 and the second data 212 may be adjusted, for example, by weighting the first data 208 more heavily than the second data 212 based on display information associated with the first display element, the second display element, or both. Further, the advertisement content may be selected based on one or more user settings. For example, the one or more user settings may include settings to block particular content, to prefer particular content, or any combination thereof. The method 200 may also include, at 216, receiving advertisement content from an advertisement content server and, at 218, displaying the advertisement content at a display device.

In a particular illustrative embodiment, the method 200 may include, at 220, modifying a view associated with at least one of the plurality of independent display elements. Modifying the view associated with at least one of the independent display elements may include, at 222, displaying new content at the independent display element. Modifying the view associated with at least one of the independent display elements may also include, at 224, hiding at least one of the independent display elements. Modifying the view associated with at least one of the plurality of independent display elements may also include, at 226, moving the at least one independent display element. For example, moving the at least one independent display element may include zooming closer to the display elements, moving the display element relative to the three-dimensional object or relative to other display elements, hiding the display element, or any combination thereof. In a particular illustrative embodiment, when a view associated with at least one of the plurality of the independent display elements is modified, at 220, first data 208 and second data 212 may be analyzed again to select new advertisement content.

Figure 3:
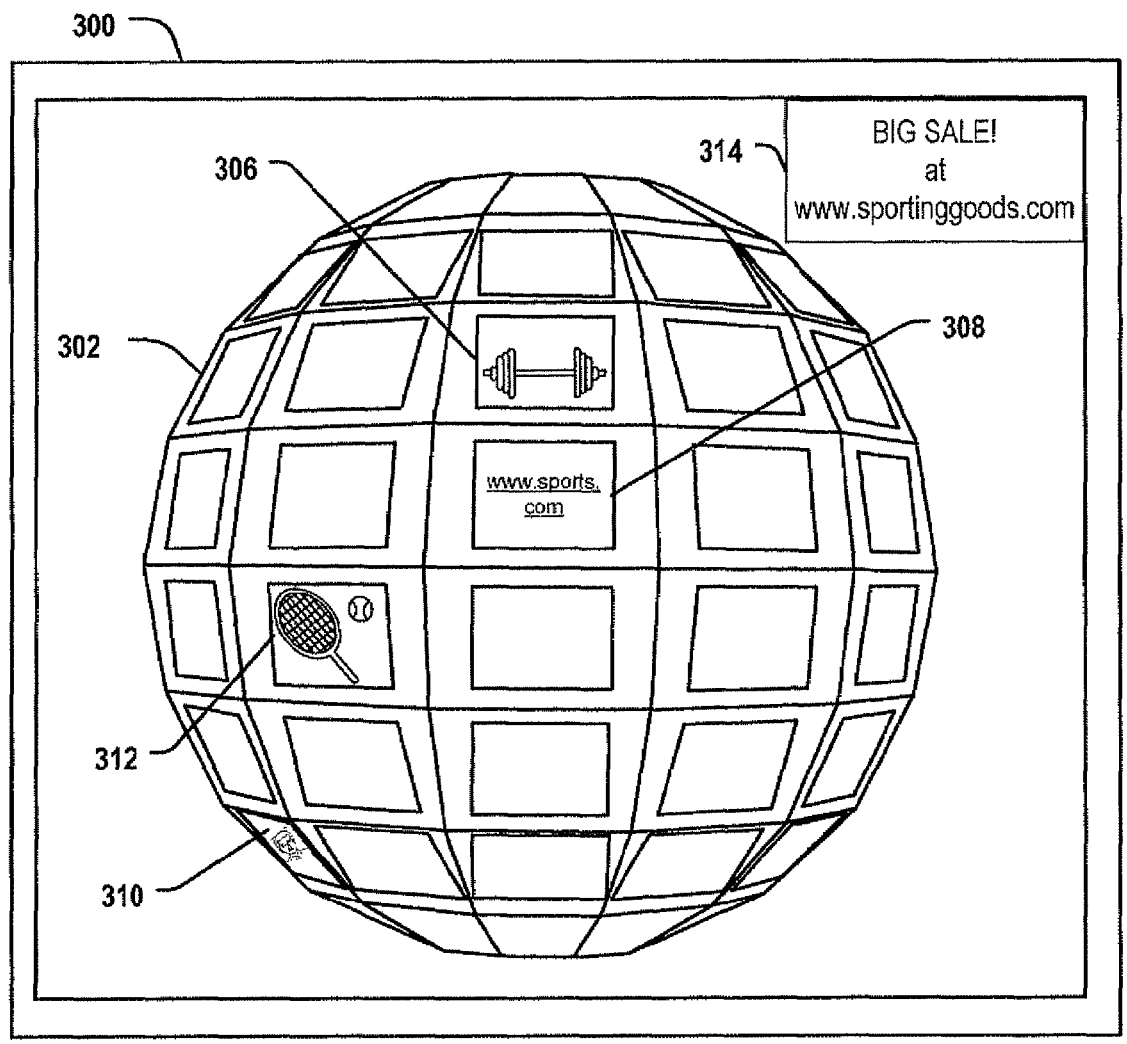
FIG. 3 is an illustration of an embodiment of a user interface display for selecting advertising content.

Referring to FIG. 3, a particular embodiment of a user interface display is depicted and generally designated 300. The user interface display 300 includes a three-dimensional graphical display with a plurality of independent display elements 306, 308, 310. The independent display elements 306, 308, 310 are associated with a representation of a three-dimensional object. For example, the representation of the three-dimensional object may include a sphere 302; a cube; one or more physical buildings, such as a plurality of stores; another physical object or geometric shape; or any combination thereof.

The user interface display 300 also includes an advertisement display window 314. In a particular embodiment, advertising content displayed at the advertisement display window 314 may be selected based on information associated with one or more of the plurality of independent display elements 306, 308, 310. For example, the advertising content displayed at advertisement window 314 may be selected based on content, metadata, graphics, text, or any combination thereof associated with a first display element 306, a second display element 308, a third display element 310, or any combination thereof. The advertising content may also be selected based on display information associated with the first display element 306, the second display element 308, the third display element 310, or any combination thereof.

To illustrate, the first display element 306 includes content associated with weightlifting, the second display element 308 includes content associated with sports news, and the third display element 310 includes content associated with a particular person. The advertising content displayed at advertisement window 314 includes advertising content associated with sales of sporting goods. The advertisement content was selected because two of the three display elements considered in this example are displaying content associated with sports. Further, more weight was given to information associated with the first display element 306 and the second display element 308 than to the third display element 310 because the first display element 306 and second display element 308 are closer to the center of the display than the third display element 310.

The user interface display also includes a fourth display element 312. The fourth display element 312 includes additional advertising content, such as information related to the sport of tennis. The additional advertising content may be selected in a manner similar to the advertising content displayed at advertisement window 314.

In conjunction with the configuration of structure described herein, the system and method disclosed provide selection of advertising content. In a particular embodiment, a computing device analyzes data associated with one or more independent display elements of a three-dimensional graphical display. The computing device selects advertising content related to the analyzed data and displays selected advertising content at an advertisement window.

According to particular embodiments, targeted advertisement content relevant to a user's interests may be selected for display. Since data associated with multiple independent display elements may be analyzed together, targeted advertising may be more relevant to the user than advertisement selected based on a single display element. Additionally, coupons, sale notifications or other time sensitive marketing materials may be provided to users with an interest in them.

Figure 4:
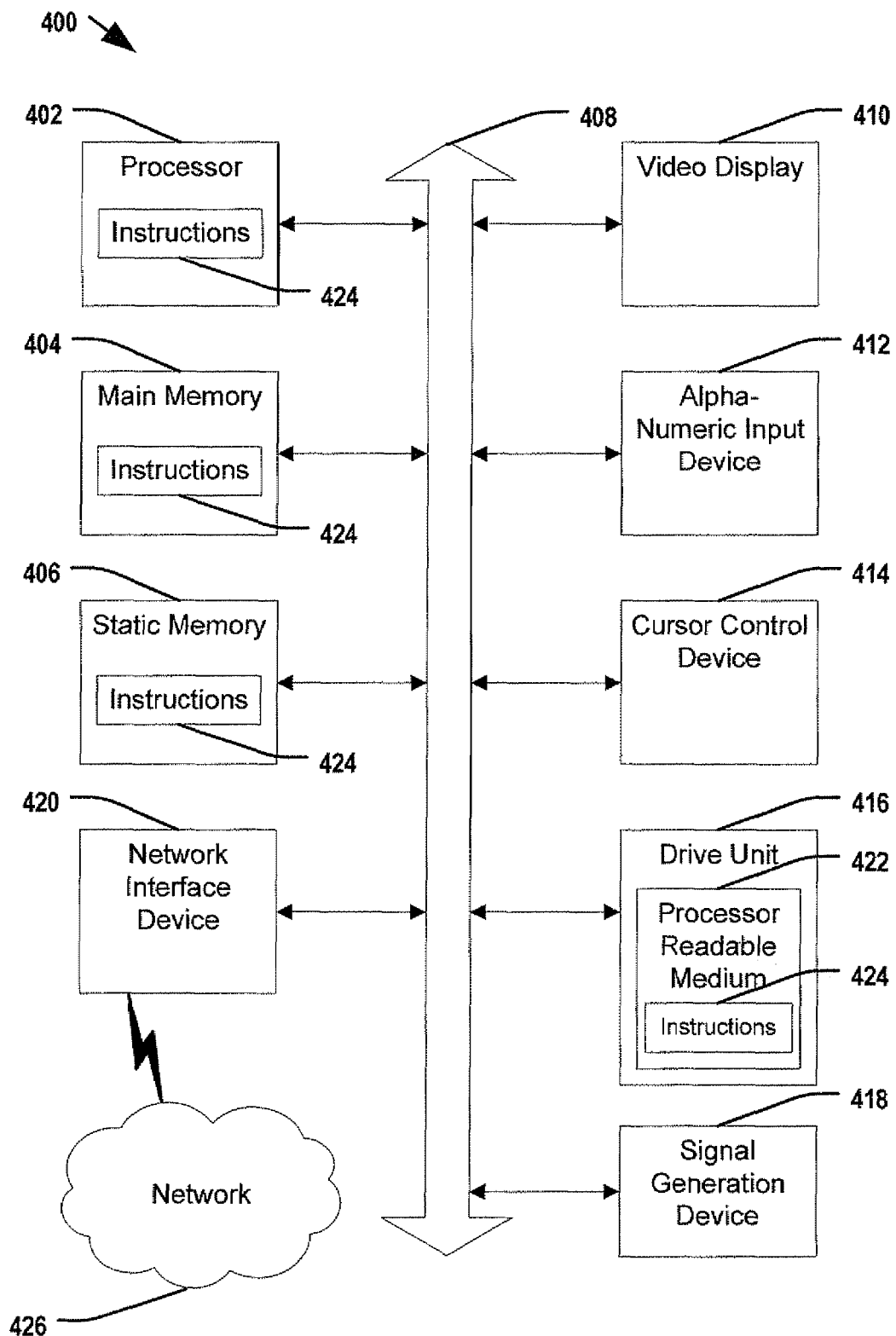
FIG. 4 is a block diagram of an illustrative general computer system.

Referring to FIG. 4, an illustrative embodiment of a general computer system is shown and is designated 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. For example, the computer system 400 may include or be included within any one or more of the computing devices, display devices or servers depicted in FIG. 1.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. Moreover, the computer system 400 can include a main memory 404 and a static memory 406, that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse or remote control device. The computer system 400 can also include a disk drive unit 416, a signal generation device 418, such as a speaker, and a network interface device 420.

In a particular embodiment, as depicted in FIG. 4, the disk drive unit 416 may include a processor-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include processor-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a processor-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the processor-readable medium is shown to be a single medium, the term "processor-readable medium" includes a single medium or multiple media, such as a centralized or distributed database, and/or associated caches and servers that store one or more sets of instructions. The term "processor-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the processor-readable medium can include a solid-state memory such as a memory card or other package that houses one or more non-volatile read-only memories. Further, the processor-readable medium can be a random access memory or other volatile re-writable memory. Additionally, the processor-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a processor-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    sending a plurality of display elements as a representation of a three-dimensional object via a user interface to a display device for display, wherein first user input controls a view of the representation, and wherein at least one display element is associated with a software application that provides content for the at least one display element;
    analyzing first data associated with a first display element of the plurality of display elements to determine first information associated with the first display element;
    analyzing second data associated with a second display element of the plurality of display elements to determine second information associated with the second display element;
    selecting first advertising content based at least partially on the first information and the second information and a location on the representation of the first display element relative to a location on the representation of the second display element; and
    displaying, at the display device, the first advertising content via an advertisement window separate from the representation of the three-dimensional object while still displaying the representation of the three-dimensional object.

2. The method of claim 1, further comprising causing multimedia content received via a network to be displayed at the first display element.

3. The method of claim 1, further comprising receiving the first advertising content from an advertisement content server.

4. The method of claim 1, wherein the first data associated with the first display element comprises a favorites list associated with a first software application.

5. The method of claim 1, wherein the first data associated with the first display element comprises history information associated with a first software application.

6. The method of claim 1, wherein the first data associated with the first display element comprises first content provided for display by a first software application.

7. The method of claim 6, wherein the first software application includes one of a browser application and a text editor application.

8. The method of claim 1, further comprising:
    analyzing third data associated with a third display element; and
    selecting second advertising content based at least partially on the first data and the third data and the location in the representation of the first display element relative to a location in the representation of the third display element.

9. The method of claim 8, further comprising sending the second advertising content to the display device for display as one or more of the plurality of display elements.

10. The method of claim 1, further comprising:
    determining that the first advertising content has been updated to include new content;
    analyzing the new content; and
    selecting second advertising content based at least partially on the new content.

11. A system comprising:
a processor;
a three-dimensional graphical display module executable by the processor and configured to send a representation of a three-dimensional graphical display via a user interface to a display device for display, wherein the representation of the three-dimensional graphical display includes display elements, wherein at least one display element is associated with a software application configured to provide content for the at least one display element, and wherein a first input controls a view of the representation sent to the display device;
an advertisement module executable by the processor and configured to send to the display device an advertisement window separate from the representation sent to the display device for concurrent display on the display device with the representation; and
an advertisement selection module executable by the processor and configured to select advertising content for display in the advertisement window based at least in part on first content associated with a first display element of the display elements based at least in part on and second content associated with a second display element of the display elements and based at least in part on a location in the representation of the first display element relative to a location in the representation of the second display element, and wherein the first display element is selected to facilitate selection of the advertising content based on the location of the first display element in the representation sent to the display device.

12. The system of claim 11, wherein the representation is a representation of a spherical shape.

13. The system of claim 11, wherein at least one of the first display element and the second display element is associated with a non-browser software application.

14. The system of claim 11, wherein the advertisement selection module further selects advertising content based on first historical information associated with the first display element and based on second historical information associated with the second display element.

15. The system of claim 14, wherein the first historical information is associated with a browser history file of a browser application.

16. The system of claim 11, further comprising a network access module to receive the advertising content via a network and to provide the advertising content to the three-dimensional graphical display module for display via one or more of the display elements.

17. The system of claim 16, wherein the network access module is further adapted to receive the advertising content for display via the advertisement window.

18. A non-transitory computer-readable medium having instructions executable by a processor to:
receive data associated with two or more display elements of a plurality of display elements of a representation of a three-dimensional object configured to be displayed on a display device, wherein at least one display element of the plurality of display elements is associated with a software application configured to provide content for the at least one display element;
analyze first data associated with a first display element of the plurality of display elements to determine first information associated with the first display element, wherein the first information includes first content associated with the first display element, a first position of the first display element in the representation, and a first weight assigned to the first position;
analyze second data associated with a second display element of the plurality of display elements to determine second information associated with the second display element, wherein the second information includes second content associated with the second display element, a second position of the second display element in the representation, and a second weight assigned to the second position;
select advertising content based at least partially on the first position and first weight of the first information and based at least partially on the second position and second weight of the second information; and
send the representation and the advertising content to the display device for concurrent display, wherein the advertising content is displayed in an advertisement window separate from the representation.

19. The non-transitory computer-readable medium of claim 18, wherein the plurality of display elements includes one or more active display elements and one or more inactive display elements, and wherein the first display element and the second display element are active display elements.

20. The non-transitory computer-readable medium of claim 18, wherein the first display element includes an active display element and the second display element includes an inactive display element.

21. The non-transitory computer-readable medium of claim 20, wherein the first weight assigned to the first position of the first display element included in the first data includes an active display element weighting value and the second weight assigned to the second position of the second display element included in the second data includes an inactive display element weighting value, wherein the active display element weighting value is greater than the inactive display element weighting value, and wherein the first content associated with the first display element is assigned more weight in selecting the advertising content than the second content associated with the second display element.

22. The non-transitory computer-readable medium of claim 18, wherein the plurality of display elements includes one or more visible display elements and one or more hidden display elements, and wherein the first display element and the second display element are visible display elements.

23. The non-transitory computer-readable medium of claim 22, wherein the first display element includes a visible display element and the second display element includes a hidden display element.

24. The non-transitory computer-readable medium of claim 23, wherein the first weight assigned to the first position of the first display element included in the first data includes a visible display element weighting value and the second weight assigned to the second position of the second display element included in the second data includes a hidden display element weighting value, wherein the visible display element weighting value is greater than the hidden display element weighting value, and wherein the first content associated with the first display element is assigned more weight in selecting the advertising content than the second content associated with the second display element.

25. The non-transitory computer-readable medium of claim 18, wherein the advertising content is selected at least partially based on a combination of the first content and the second content.

* * * * *